United States Patent
Hendler et al.

(10) Patent No.: US 6,473,777 B1
(45) Date of Patent: Oct. 29, 2002

(54) METHOD FOR ACCELERATING JAVA VIRTUAL MACHINE BYTECODE VERIFICATION, JUST-IN-TIME COMPILATION AND GARBAGE COLLECTION BY USING A DEDICATED CO-PROCESSOR

(75) Inventors: Danny Hendler, Kiryat-ono (IL); Jonathan Levy, Kfar-Saba (IL); Avi Mendelson, Haifa (IL)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/183,200

(22) Filed: Oct. 30, 1998

(51) Int. Cl.[7] .............................................. G06F 17/30
(52) U.S. Cl. ........................ 707/206; 711/6; 711/165; 707/200
(58) Field of Search .................................. 709/104, 105, 709/201, 310, 328; 707/206, 8, 205, 200; 711/6, 165

(56) References Cited

U.S. PATENT DOCUMENTS

| | | | |
|---|---|---|---|
| 4,817,140 A | 3/1989 | Chandra et al. | 380/4 |
| 5,546,398 A | 8/1996 | Tucker et al. | 370/94.1 |
| 5,619,713 A | 4/1997 | Baum et al. | 395/800 |
| 5,692,185 A | 11/1997 | Nilsen et al. | 395/615 |
| 5,701,470 A | 12/1997 | Joy et al. | 395/614 |
| 5,953,736 A | * 9/1999 | O'Connor et al. | 711/6 |
| 6,003,065 A | * 12/1999 | Yan et al. | 709/201 |

* cited by examiner

Primary Examiner—Majid Banankhah
(74) Attorney, Agent, or Firm—Stallman & Pollock LLP

(57) ABSTRACT

A coprocessor performs an overhead function of a Java virtual machine executing in a main processor. The coprocessor includes memory access circuitry configured to access a memory also accessible by the host processor. Pointer receiving circuitry is configured to receive at least one pointer to data in the memory pertinent to the overhead function. Function performing circuitry is configured to perform the overhead function to operate on the data in the memory pointed to by the at least one pointer. Result passing circuitry configured to pass a result back to the main processor. For example, overhead functions that may be performed by the coprocessor include bytecode verification, just-in-time compiling and garbage collection.

11 Claims, 2 Drawing Sheets

METHOD FOR ACCELERATING JAVA VIRTUAL MACHINE BYTECODE VERIFICATION, JUST-IN-TIME COMPILATION AND GARBAGE COLLECTION BY USING A DEDICATED CO-PROCESSOR

TECHNICAL FIELD

The present invention relates to processors for executing a Java Virtual Machine and, in particular, to a coprocessor that handles selected overhead portions of execution off-loaded from a main processor.

BACKGROUND

The Java Virtual Machine is an abstract computing machine. The structure of this abstract computing machine, including its instruction set, have been defined by Sun Microsystems, Inc. and is set forth in "The Java Virtual Machine Specification", published by Addison-Wesley in 1996. The Java Virtual Machine employs a "class" file that contains Java Virtual Machine instructions (known as "bytecodes"). As envisioned by its creators, code written for the Java Virtual Machine is to be platform-independent. That is, code written for a Java Virtual Machine implemented for one underlying processor (or operating system) should execute identically when executed on a Java Virtual Machine implemented for another underlying processor (or operating system).

Many implementations of Java are interpreted, meaning that, in general, the Java bytecodes are fetched, decoded and executed in turn. Interpretation is slow mainly because of the additional level of decoding required. Furthermore, bytecodes interpretation is particularly slow because the Java Virtual Machine employs a stack machine model, which involves many slow pushes and pops from the machine stack. Programs written in Java, whether or not interpreted, are also known to execute relatively slowly because of the large amount of constraint checking that must be performed at runtime. Constraint checking is an important security consideration, since many Java programs are downloaded from insecure sources such as the internet.

To address the concerns of slowness, other implementations of Java perform just-in-time ("JIT") compilation of the Java bytecodes as described, for example, in "Compiling Java Just in Time", in the May/June 1997 edition of IEEE Micro. Essentially, the compilation occurs at runtime, as opposed to more conventional compilation, which occurs before runtime. JIT is particularly beneficial when a portion of Java code (e.g., a Java method) will be executed more than once, and the overhead associated with its compilation can be substantially avoided for executions of the method after the first. Even the resulting JIT-compiled code, however, must include code for constraint checking.

Other factors affect the speed (or lack thereof) of execution of Java code. For example, "garbage collection" is an overhead task that executes to reclaim unused objects and, conventionally, takes processor cycles that could otherwise be used to execute Java instructions.

What is desired is a system that can competently implement the Java Virtual Machine Specification, in a way that provides improved speed of execution.

SUMMARY

A coprocessor performs an overhead function of a Java virtual machine executing in a main processor. The coprocessor includes memory access circuitry configured to access a memory also accessible by the host processor. Pointer receiving circuitry is configured to receive at least one pointer to data in the memory pertinent to the overhead function. Function performing circuitry is configured to perform the overhead function to operate on the data in the memory pointed to by the at least one pointer. Result passing circuitry configured to pass a result back to the main processor. For example, overhead functions that may be performed by the coprocessor include bytecode verification, just-in-time compiling and garbage collection.

DETAILED DESCRIPTION

In accordance with the invention, certain overhead activities of executing a Java program are offloaded from a main processor to a coprocessor. These offloaded activities are handled in parallel with Java Virtual Machine activities of the main processor.

Figure 1:
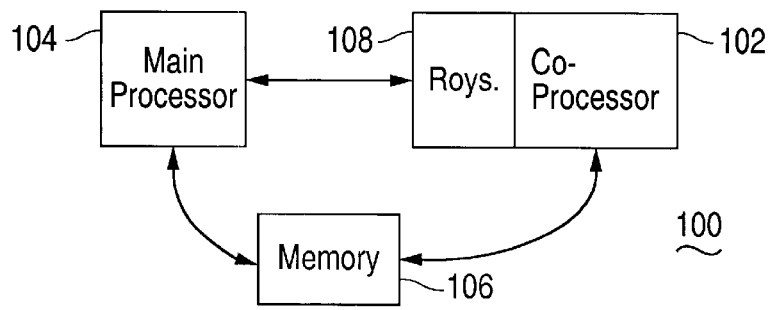
FIG. 1 is a block diagram of a system 100 of which the coprocessor i accordance with an embodiment of the invention is a part.

FIG. 1 illustrates, in block form, an embodiment of a system 100 in which the offloaded overhead activities may be executed by a coprocessor 102, in parallel with other Java Virtual Machine activities being executed by a main processor 104. The coprocessor 102 and the main processor 104 communicate via a shared memory 106 or, preferably, registers 108 for faster communication. The main processor 104 and coprocessor 102 may be integrated onto a single chip, or the coprocessor 102 may be provided on a separate chip. In one embodiment, where the coprocessor 102 is provided on a separate chip, the registers 108 are formed as an integral part of the coprocessor 102 chip. Some or all of the offloaded overhead activities may be performed by the coprocessor by executing software or, alternately, by hardware logic.

Figure 2:
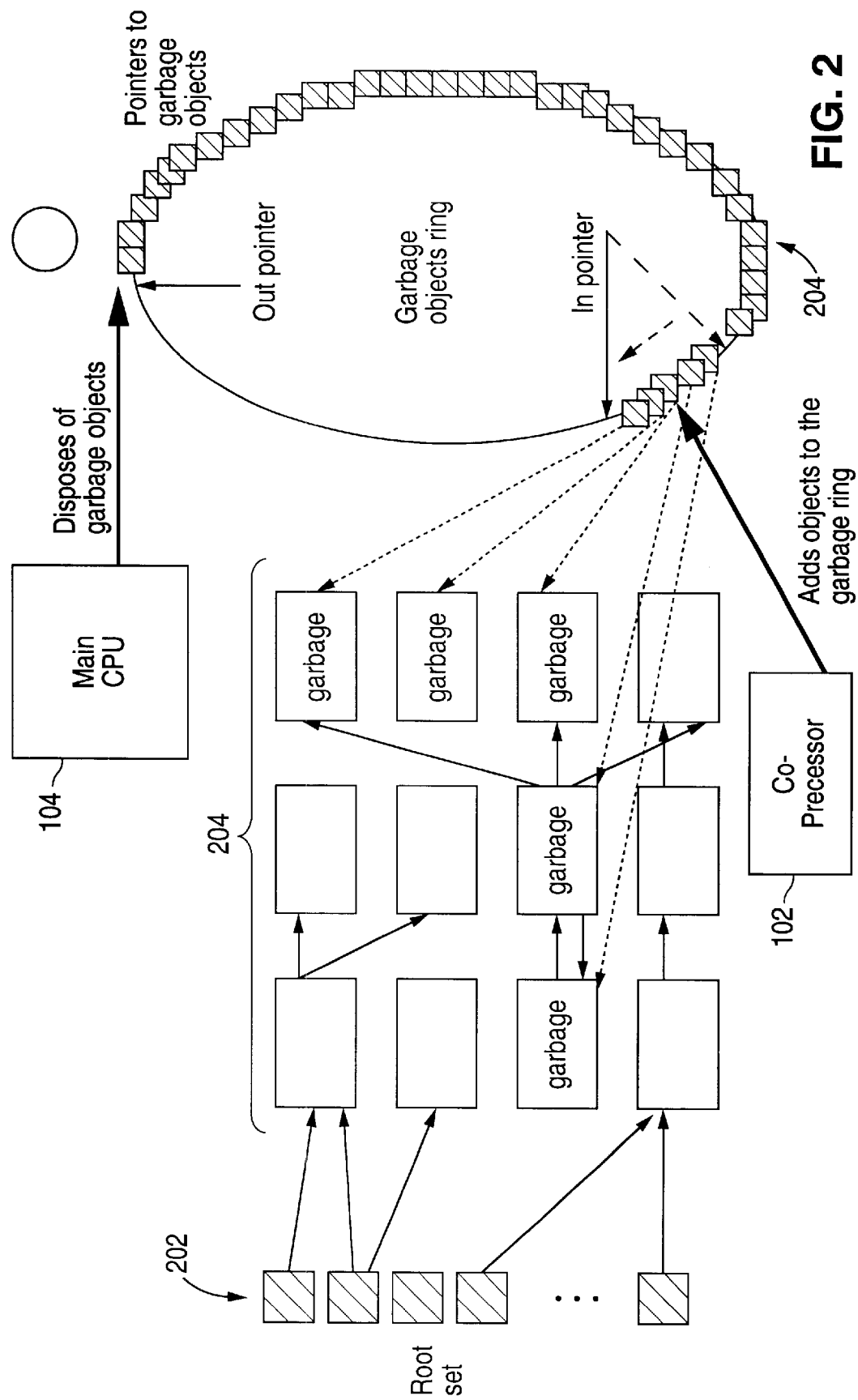
FIG. 2 illustrates how the FIG. 1 coprocessor may be used to offload garbage collection activity of a Java Virtual Machine executing on the main processor.

In general, ideal activities for offloading to the coprocessor 102 are activities that are substantially self-contained. For example, in accordance with an embodiment of the invention shown in FIG. 2, garbage collection activity of the Java Virtual Machine is distributed between the main processor 104 and the coprocessor 102. In general terms, this distributed garbage collection activity is a "mark and sweep" implementation of garbage collection, where marking of garbage objects is done by the coprocessor 102 and sweeping is done by the main processor 104. The Java Virtual Machine program executing on the main processor 104 communicates to the coprocessor 104 a list of pointers to the "objects root set" 202 of the methods of the currently executing Java program. From this root set 202, the coprocessor 102 enumerates all existing Java objects 204 based on its knowledge of the underlying list structure. Then, the coprocessor 102 scans, starting from the root set 202, all objects reachable from the root set. This may be done, for example, by a conventional breadth-first-search or a depth-first-search. Thereafter, any existing one of the objects 204 that was not reached is considered to be garbage. The garbage collection program executing on the coprocessor 102 then adds the new garbage objects to a list of pointers 204 which may be, for example, a ring of pointers. The main processor, when it is "convenient", disposes of some or all of the garbage objects pointed to by the ring of pointers. The disposal processing by the main processor may include calling "finalizer" of the objects. A "finalizer" is an instance function (i.e., a class function which operates on a specific object of the class) which should be activated by the garbage collector just before a garbage object is killed (garbage collected), so as to perform final processing such as resource freeing. Finalizers are not used very frequently.

Another overhead activity that may be offloaded by the main processor 104 to the coprocessor 102 is a portion of bytecode verification activity. In a preferred embodiment, what is offloaded to the coprocessor 102 is the portion of the bytecode verification of a single class file, that does not require inspection of other class file—specifically, the Static Constraints (as defined in pages 118–121 of the Java Virtual Machine Specification) and some of the Structural Constraints (as defined in pages 121–125 of the Java Virtual Machine Specification). The main processor 104 communicates, to the coprocessor 102, a pointer to the class structure in the shared memory. The coprocessor 102 executes a verification program on that class structure and returns to the main processor 104 (e.g., via one of the shared registers 108 in FIG. 1) an indication of whether the class structure could be successfully verified and, if not, the reason for the failure.

Yet another overhead activity that may be offloaded to the coprocessor is just-in-time (JIT) compilation of a particular Java method. The main processor 104 supplies to the coprocessor 102 the following inputs: a memory pointer to the constants pool in the memory 106 of the class to which the method belongs; a memory pointer to the bytecodes of the method in the memory 106, a memory pointer to the block of the memory 106 (results block) to which the resulting native code should be stored, and a memory pointer to that results block. After receiving these pointers, the coprocessor executes what may be a conventional program to compile the Java bytecodes into instructions native to the main processor 104 and stores those native instructions at the results block of the memory 106.

Figure 3:
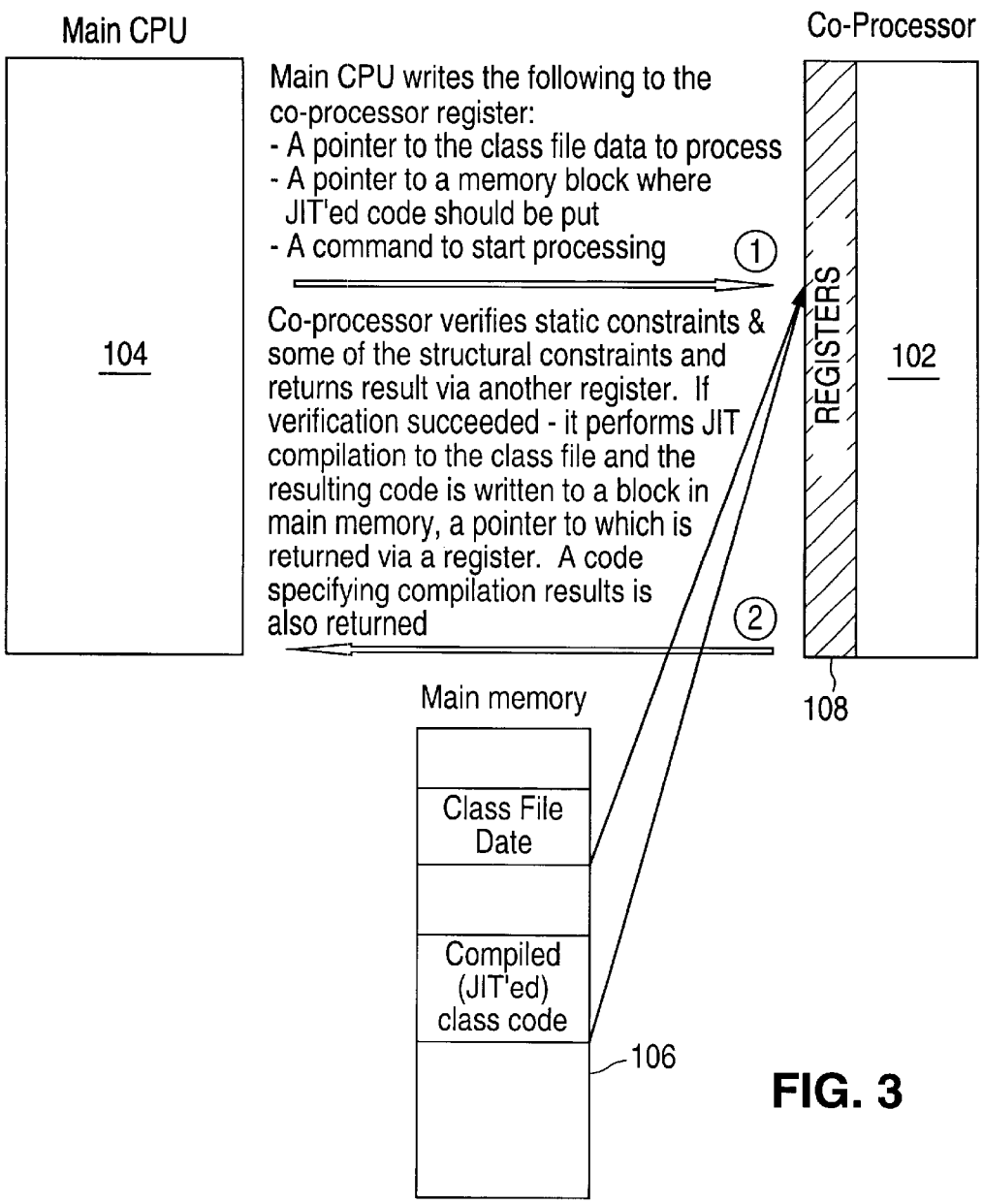
FIG. 3 illustrates how a combination of JIT compilation, and bytecode verification during that JIT compilation, may be offloaded in combination by a main processor to a coprocessor in accordance with the present invention.

FIG. 3 illustrates how a combination of JIT compilation, and bytecode verification during that JIT compilation, may be offloaded in combination by the main processor 104 to the coprocessor 102. In a first step, a program in the main processor 104 writes the following to the registers 108: a pointer to a class file data to process; a pointer to a block in the shared memory 106 to which the compiled code should be stored; and a command for the coprocessor 102 to start processing.

The examples of garbage collection, bytecode verification, and JIT are only some examples of Java Virtual Machine activities suitable for offloading from a main processor 104 to a coprocessor 102 and their description here are not meant to limit the scope of the claims. As discussed above, ideal activities for offloading to the coprocessor 102 are activities that are substantially self-contained. In particular, such self-contained activities require little involvement of the main processor 104 and, thus, the main processor 104 can continue to handle other Java Virtual Machine activities while the coprocessor 102 is handling the offloaded activities.

What is claimed is:

1. A system that performs overhead functions of a Java virtual machine in parallel with execution of the Java virtual machine, the system comprising:

a host processor that executes the Java virtual machine;
a memory unit accessible by the host processor; and
a coprocessor connected for communication with the host processor, the memory unit also being accessible by the coprocessor, the coprocessor comprising:
(i) memory access circuitry configured to access the memory unit;
(ii) pointer receiving circuitry configured to receive at least one pointer to data stored in the memory unit that is pertinent to an overhead function;
(iii) function performing circuitry configured to perform the overhead function to operate on the data stored in the memory unit that is pointed to by the at least one pointer; and
(iv) result passing circuitry configured to communicate a result of the performance of the overhead function to the host processor.

2. The system of claim 1, and wherein:
the overhead function is garbage collection functions of the Java virtual machine; and wherein
the data in the memory unit to which the at least one pointer points includes an object list indicating active root Java objects that exist in the memory unit; and wherein
the coprocessor further comprises thread following circuitry configured to follow threads from the indicated root objects to determine which, if any, of a plurality of active objects, which include root objects, are unreachable because said active objects are not a part of any thread, and
designating circuitry configured to designate the active objects that are determined to be not a part of any thread as garbage objects and providing the designation back to the main processor as the result.

3. The system of claim 1, and wherein:
the overhead function is bytecode verification functions of the Java virtual machine; and wherein
the data in the memory unit to which the at least one pointer points includes a class structure; and wherein
the coprocessor further comprises verification circuitry that performs the bytecode verification overhead function and provides to the main processor an indication of the verification as the result.

4. The system of claim 1, and wherein:
the overhead function is a just-in-time (JIT) compilation of a method of the Java virtual machine to generate, from Java bytecodes of the method, native instructions corresponding to the Java bytecodes; and wherein
the data in the memory unit to which the at least one pointer points includes a constants pool of a class to which the method belongs and the bytecodes of the method; and wherein
the coprocessor further comprises JIT overhead circuitry configured to perform the just-in-time overhead function by generating the native instructions corresponding to the Java bytecodes and storing the native instructions into the memory unit.

5. A dedicated coprocessor that performs garbage collection functions of a Java virtual machine executing in a host processor, the coprocessor comprising:
object list receiving circuitry configured to receive a root object list indicating an active root Java object that exists in a memory unit shared between the host processor and the coprocessor;
thread following circuitry configured to follow threads from the indicated active root object in order to determine which, if any, of a plurality of active objects, which includes the root object, are unreachable because they are not a part of any thread;

garbage object designating circuitry configured to designate the active object that is determined to be not a part of any thread as a garbage object and to provide the designation back to the host processor.

6. A dedicated coprocessor that performs a portion of bytecode verification functions of class structures for a Java virtual machine executing in a host processor, the coprocessor comprising:

class structure pointer receiving circuitry configured to receive from the main processor a pointer to a class structure in a memory unit shared between the host processor and the coprocessor;

verifying circuitry configured to verify at least some of the portions of the pointed-to class structure that do not require reference to another class structure; and indication providing circuitry configured to provide to the host processor an indication of a result of the verification.

7. A dedicated coprocessor that performs a just-in-time (JIT) compilation for a method of a Java virtual machine executing in a host processor, to generate, from Java bytecodes of the method, native instructions of the host processor corresponding to the Java bytecodes, the coprocessor comprising:

constants pool receiving circuitry configured to receive a pointer to a constants pool, of a class to which the method belongs, in a memory unit shared between the host processor and the coprocessor;

bytecodes pointer receiving circuitry configured to receive a pointer to the bytecodes of the method in the memory unit; and instructions generating circuitry configured to generate the native instructions corresponding to the Java bytecodes and to store the native instructions into the memory unit.

8. A method of performing functions of a Java virtual machine in a computer system, the computer system including a host processor, a coprocessor, and a memory unit shared between the host processor and the coprocessor, the method comprising:

performing first functions of the Java virtual machine utilizing the host processor;

passing from the host processor to the coprocessor at least one pointer to data in the memory unit pertinent to an overhead function of the Java virtual machine;

receiving the at least one pointer at the coprocessor and performing the overhead function by the coprocessor operating on the data in the memory unit pointed to by the at least one pointer;

passing the result of the performance of the overhead function from the coprocessor to the main processor; and utilizing the main processor to continue to perform the first functions, using the result passed from the coprocessor.

9. The system of claim 8, and wherein:

the overhead function is garbage collection functions of the Java virtual machine; and wherein the data in the memory to which the at least one pointer passed by the host processor points includes an object list indicating active root Java objects that exist in the memory unit; the method further comprising:

utilizing the coprocessor to perform the garbage collection overhead function by following threads from the indicated root objects in order to determine which, if any, of a plurality of active objects, which include root objects, are unreachable because they are not a part of any thread; and designating the active objects that are determined to be not a part of any thread as garbage objects and providing the designation back to the host processor.

10. The system of claim 8, and wherein:

the overhead function is bytecode verification functions of the Java virtual machine; and wherein the data in the memory unit to which the at least one pointer passed by the host processor points includes a class structure the method further comprising:

utilizing the coprocessor to perform the bytecode verification overhead function on the class structure.

11. The method of claim 8, and wherein:

the overhead function is a just-in-time (JIT) compilation of a method of the Java virtual machine to generate, from Java bytecodes of the method, native instructions corresponding to the Java bytecodes;

the data in the memory unit to which the at least one pointer passed by the host processor points includes a constants pool of a class to which the method belongs and the bytecodes of the method, the method further comprising:

utilizing the coprocessor to perform the just-in-time overhead function by generating the native instructions corresponding to the Java bytecodes and storing the native instructions into the memory unit.

* * * * *